(12) United States Patent
Wang

(10) Patent No.: US 8,416,760 B2
(45) Date of Patent: Apr. 9, 2013

(54) TRANSMITTER AND DATA TRANSMISSION METHOD

(75) Inventor: Xiaomei Wang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,028

(22) PCT Filed: Apr. 19, 2010

(86) PCT No.: PCT/CN2010/071870
§ 371 (c)(1),
(2), (4) Date: Jan. 6, 2012

(87) PCT Pub. No.: WO2011/006380
PCT Pub. Date: Jan. 20, 2011

(65) Prior Publication Data
US 2012/0177014 A1 Jul. 12, 2012

(30) Foreign Application Priority Data
Jul. 17, 2009 (CN) .......................... 2009 1 0159165

(51) Int. Cl.
*H04B 7/208* (2006.01)
(52) U.S. Cl. ...................................................... 370/344
(58) Field of Classification Search .................. None
See application file for complete search history.

(56) References Cited

U.S. PATENT DOCUMENTS

| 2008/0214126 | A1 | 9/2008 | Holt | |
|---|---|---|---|---|
| 2009/0034474 | A1* | 2/2009 | Yavuz et al. | 370/331 |
| 2009/0274103 | A1* | 11/2009 | Yang et al. | 370/329 |
| 2010/0034152 | A1* | 2/2010 | Imamura | 370/329 |
| 2010/0039927 | A1* | 2/2010 | Noh et al. | 370/210 |
| 2010/0067591 | A1* | 3/2010 | Luo et al. | 375/260 |
| 2010/0142455 | A1* | 6/2010 | Imamura | 370/329 |
| 2010/0272055 | A1* | 10/2010 | Noh et al. | 370/329 |

FOREIGN PATENT DOCUMENTS

| CN | 101610235 A | 12/2009 |
|---|---|---|
| WO | 2008084622 A1 | 7/2008 |
| WO | 2008133981 A1 | 11/2008 |

OTHER PUBLICATIONS

Eiko Seidel, Progress on "LTE Advanced"—the new 4G standard, nomor research, Jul. 24, 2008.
International Search Report for PCT/CN2010/071870 dated Jul. 1, 2010.

* cited by examiner

*Primary Examiner* — Otis L Thompson, Jr.
(74) *Attorney, Agent, or Firm* — Ling Wu; Stephen Yang; Ling and Yang Intellectual Property

(57) ABSTRACT

A transmitting terminal and a method for transmitting data are provided by the present invention, in which a multiple access mode is extended when transmitting upstream data. The method comprises: when the transmitting terminal transmits the upstream data, if the transmitting terminal has higher requirement on link performance than on time domain coverage, selecting the multiple access mode of OFDMA; and if the transmitting terminal has higher requirement on time domain coverage than on link performance, selecting the multiple access mode of SC-FDMA, and after selecting the multiple access mode, the transmitting terminal processing and then transmitting the data to be transmitted. The invention is adopted to solve the problem that a single multiple access mode cannot be well suitable in the related art, ensure the link performance of OFDMA, be beneficial to enhance the throughput of the entire network.

10 Claims, 5 Drawing Sheets

TRANSMITTER AND DATA TRANSMISSION METHOD

TECHNICAL FIELD

The present invention relates to the field of Orthogonal Frequency Division Multiplexing (OFDM), and in particular, to a transmitting terminal and a method for transmitting data.

BACKGROUND OF THE RELATED ART

In an OFDM system, each sub-data stream has a relatively low bit rate by decomposing a data stream into several sub-data streams through the OFDM, and then each sub-data stream is respectively modulated on the corresponding sub-carrier for parallel transmission. It should be pointed out that, various sub-carriers of OFDM are not only orthogonal with each other, but also have an overlap of ½.

As information symbols of a single-carrier system are directly modulated on the time domain (or are some simple variations), the Peak Average Power Ratio (PAPR) is relatively low. For the multiple-carrier system, as at the same time a plurality of carriers transmits the information symbols simultaneously, while the information symbols carried by each carrier are independent with each other, the PAPR is relatively large, which is generally 2-3 dB larger than the single-carrier system.

In the Long Term Evolution (LTE) system, the PAPR problem of the User Terminal (UT) is sufficiently considered. The OFDM system has a larger PAPR, that is, the instantaneous value of the output signal of the transmitter will have greater fluctuations, which will require some components within the system, such as a power amplifier, Analog-Digital (A/D) and Digital-Analog (D/A) converters etc., to have a large linear dynamic range. At the same time, the non-linear of these components will generate a non-linear distortion on the signal with a large dynamic range, and the generated harmonics will cause mutual interference on sub-channels, thus affecting the performance of the OFDM system. Therefore, in the LTE system, upstream multiple-access selects Single Carrier-Frequency Division Multiplex Access (SC-FDMA) finally, a very important reason of which is the PAPR problem. The high PAPR increases the requirement on the linearity of the power amplifier, which is particularly disadvantageous to the UT, so a relatively ideal solution of the upstream multiple-access is a single-carrier system with a cyclic prefix, i.e., SC-FDMA.

At present, the research on the multiple access on the basis of the OFDM system is a hot point. However, the researches on a plurality of multiple access modes such as Orthogonal Frequency Division Multiple Access (OFDMA) and SC-FDMA and so on, which exist simultaneously, are few. Take the LTE system for an example (at present, in the system, there is only one multiple access mode for the upstream and downstream respectively), at present, the system uses the OFMDA on the downstream, and uses the SC-FDMA on the upstream, but cannot well suitable for requirements of new systems. The LTE-Advanced system and the International Mobile Telecommunications-Advanced (IMT-Advanced) system put forward relatively high requirements on the peak data rate and spectral efficiency, which necessarily leads to reconsider the application of the OFDM system.

SUMMARY OF THE INVENTION

The technical problem to be solved by the present invention is to provide a transmitting terminal and a method for transmitting data, to overcome the problem that the single multiple access mode cannot be well suitable in the related art.

In order to solve the above problem, the present invention provides a method for transmitting data, comprising: when a transmitting terminal transmits upstream data, selecting a multiple access mode of Orthogonal Frequency Division Multiple Access (OFDMA) if the transmitting terminal has a requirement on link performance higher than a requirement on time domain coverage, selecting a multiple access mode of Single Carrier-Frequency Division Multiplexing Access (SC-FDMA) if the transmitting terminal has the requirement on time domain coverage higher than the requirement on link performance, after selecting the multiple access mode, the transmitting terminal processing the data to be transmitted and transmitting the processed data.

If the transmitting terminal selects the multiple access mode of SC-FDMA, the processing the data to be transmitted comprises: constellation modulation, Discrete Fourier Transform (DFT), sub-carrier mapping, spatial diversity or spatial multiplexing, Inverse Fast Fourier Transform (IFFT) and CP adding; and if the transmitting terminal selects the multiple access mode of OFDMA, the processing the data to be transmitted comprises: constellation modulation, serial parallel conversion, sub-carrier mapping, spatial diversity or spatial multiplexing, IFFT and CP adding.

On the basis of satisfying scheduling time delay, the transmitting terminal processing the data to be transmitted further comprises: scheduling the data to be transmitted on two or more time transmission intervals;

the operation of scheduling the data to be transmitted on two or more time transmission intervals is implemented before constellation modulation, is implemented after the constellation modulation and before switching, or is implemented before sub-carrier mapping.

The transmitting terminal selecting the multiple access mode further comprises:

selecting the multiple access mode of SC-FDMA when the transmitting terminal is at the edge of a cell; and selecting the multiple access mode of OFDMA when the transmitting terminal is in the center of the cell.

The transmitting terminal selecting the multiple access mode further comprises: selecting the multiple access mode of SC-FDMA when the transmitting terminal transmits the data using a physical control channel; and selecting the multiple access mode of OFDMA when the transmitting terminal transmits the data using a physical service channel.

The method is suitable for a long term evolution system, an advanced long term evolution system, or an international mobile telecommunications-advanced system.

The present invention further provides a transmitting terminal, comprising: a selection module, a data processing module and a transmitting module; wherein, the selection module is configured to: select a multiple access mode when the transmitting terminal transmits upstream data, select a multiple access mode of Orthogonal Frequency Division Multiple Access (OFDMA) if the transmitting terminal has a requirement on link performance higher than a requirement on time domain coverage, and select a multiple access mode of Single Carrier-Frequency Division Multiplexing Access (SC-FDMA) if the transmitting terminal has the requirement on time domain coverage higher than the requirement on link performance;

the data processing module is configured to process the data to be transmitted; and the transmitting module is configured to transmit the processed data.

The data processing module comprises a constellation modulation unit, a switching unit, a Discrete Fourier Transform (DFT) unit, a serial parallel conversion unit, a sub-carrier mapping unit, a spatial diversity or spatial multiplexing unit, an Inverse Fast Fourier Transform (IFFT) unit and a CP adding unit;

the selection module is further configured to send the selected multiple access mode to the data processing module; and the switching unit is configured to: receive the multiple access mode, send the received, constellation modulated data to the DFT unit when the multiple access mode is SC-FDMA, and send the received, constellation modulated data to the serial parallel conversion unit when the multiple access mode is OFDMA.

The data processing module further comprises a time domain extension unit, which is configured to schedule the data to be transmitted on two or more time transmission intervals on the basis of satisfying scheduling time delay;

the time domain extension unit is located before a constellation modulation unit, is located between a constellation modulation unit and a switching unit, or is located before a sub-carrier mapping unit.

The selection module is further configured to: select the multiple access mode of SC-FDMA when the transmitting terminal is at the edge of a cell, and select the multiple access mode of OFDMA when the transmitting terminal is in the center of the cell.

The selection module is further configured to: select the multiple access mode of SC-FDMA when the transmitting terminal transmits the data using a physical control channel, and select the multiple access mode of OFDMA when the transmitting terminal transmits the data using a physical service channel.

The transmitting terminal is suitable for a long term evolution system, an advanced long term evolution system, or an international mobile telecommunications-advanced system.

In conclusion, the present invention provides a transmitting terminal and a method for transmitting data, which extends the multiple access mode when the upstream data is transmitted, and solves the problem that a single multiple access mode cannot be well suitable in the related art, that is, solves the problem that in the existing system only the PAPR is considered which reduces the link performance. The invention not only ensures the link performance of OFDMA, but also is beneficial to enhance the throughput of the entire network, and simultaneously solves the compatibility problem with the existing system by taking the coverage range into consideration.

The present invention is suitable for an LTE system, an LTE-Advanced system, and an IMT-Advanced system.

PREFERRED EMBODIMENTS OF THE PRESENT INVENTION

Figure 1:
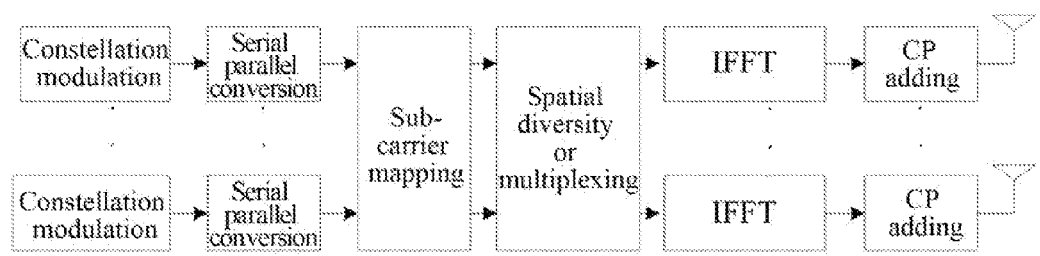
FIG. 1 is a structural diagram of an OFDMA transmitter in the related art.
Figure 2:
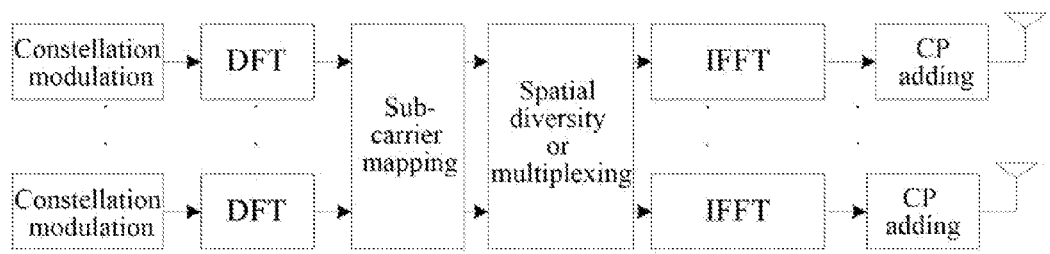
FIG. 2 is a structural diagram of a SC-FDMA transmitter in the related art.
Figure 3:
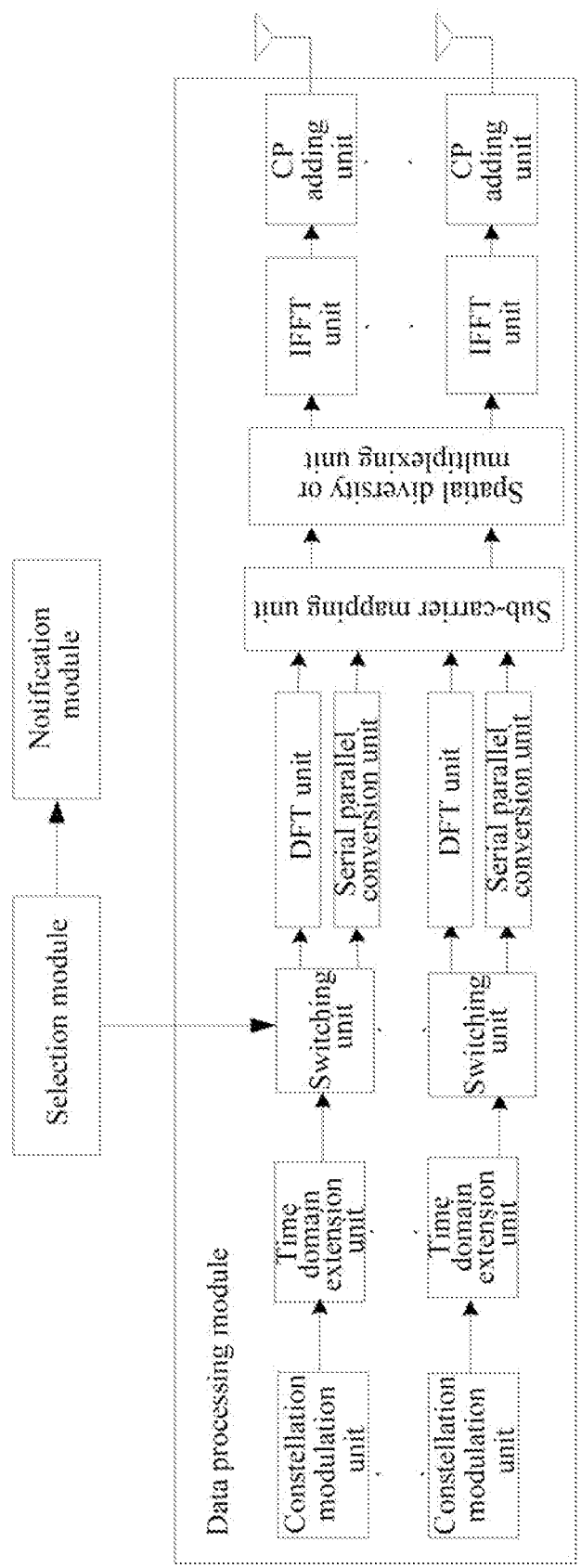
FIG. 3 is a schematic diagram of a structure of a transmitting terminal according to the present invention.

The technical problem to be solved by the present invention is to provide a transmitting terminal and a method for transmitting data. When transmitting upstream data, the transmitting terminal selects the multiple access mode of the OFDMA if the transmitting terminal has higher requirement on link performance than on time domain coverage, and selects the multiple access mode of the SC-FDMA if the transmitting terminal has higher requirement on time domain coverage than on link performance, and after selecting the multiple access mode, the transmitting terminal processes the data to be transmitted and then transmits. This solution can be well suitable for the requirements of new systems (LTE-Advanced system and IMT-Advanced system).

The present embodiment provides a transmitting terminal, comprising: a selection module, a data processing module and a transmitting module; wherein, the transmitting terminal can further comprise a notification module;

the data processing module comprises a constellation modulation unit, a switching unit, a Discrete Fourier Transform (DFT) unit, a serial parallel conversion unit, a sub-carrier mapping unit, a spatial diversity or spatial multiplexing unit, an Inverse Fast Fourier Transform (IFFT) unit and a CP adding unit, and can further comprise a time domain extension unit;

the selection module is used to, when the transmitting terminal transmits upstream data, select the multiple access mode, if the transmitting terminal has a requirement on link performance higher than that on time domain coverage, then select the multiple access mode of OFDMA, and if the transmitting terminal has a requirement on time domain coverage higher than that on link performance, then select the multiple access mode of SC-FDMA; for example, when the transmitting terminal is at the edge of a cell, the transmitting terminal may have the higher requirement on time domain coverage than the requirement on link performance, and therefore, the multiple access mode of SC-FDMA can be selected, while when the transmitting terminal is in the center of the cell, the transmitting terminal may have the higher requirement on link performance than the requirement on time domain coverage, and therefore, the multiple access mode of OFDMA can be selected; likewise, when the transmitting terminal transmits data using a physical control channel, the transmitting terminal may have the higher requirement on time domain coverage than the requirement on link performance, and therefore, the multiple access mode of SC-FDMA can be selected, while when the transmitting terminal transmits data using a physical service channel, the transmitting terminal may have the higher requirement on link performance than the requirement on time domain coverage, and therefore, the multiple access mode of OFDMA can be selected;

the selection module is further used to send the selected multiple access mode to the data processing module and the notification module;

the switching unit is used to receive the multiple access mode, and send the received, constellation modulated data to the DFT unit when the multiple access mode is SC-FDMA, and send the received, constellation modulated data to the serial parallel conversion unit when the multiple access mode is OFDMA.

The process modes on the received data by the constellation modulation unit, the DFT unit, the serial parallel conversion unit, the sub-carrier mapping unit, the spatial diversity or spatial multiplexing unit, the IFFT unit and the CP adding unit are the same as those in the related art.

The time domain extension unit is used to schedule the data to be transmitted on two or more Time Transmission Intervals (TTI) on the basis of satisfying scheduling time delay; the module can be located before the constellation modulation unit, be located between the constellation modulation unit and the switching unit, or be located before the sub-carrier mapping unit.

The notification module is used to send a notification message to the receiving terminal to indicate the multiple access mode selected by the transmitting terminal after the transmitting terminal selects the multiple access mode.

The transmitting terminal comprises one or more of the constellation modulation unit, the time domain extension unit, the switching unit, the DFT unit, the serial parallel conversion unit, the IFFT unit and the CP adding unit.

The present embodiment provides a method for transmitting data, comprising:

before the transmitting terminal transmits upstream data, selecting the multiple access mode according to the current requirement, and in particular, selecting the multiple access mode of OFDMA if the transmitting terminal currently has higher requirement on link performance than on time domain coverage, and selecting the multiple access mode of SC-FDMA if the transmitting terminal currently has higher requirement on time domain coverage than on link performance;

after selecting the multiple access mode, the transmitting terminal performing corresponding processes on the data to be transmitted based on the specific multiple access mode, and in particular, if the multiple access mode of SC-FDMA is selected, the processes on the data to be transmitted including: constellation modulation, DFT, sub-carrier mapping, spatial diversity or spatial multiplexing, IFFT and CP adding; and if the multiple access mode of OFDMA is selected, the processes on the data to be transmitted including: constellation modulation, serial parallel conversion, sub-carrier mapping, spatial diversity or spatial multiplexing, IFFT and CP adding; and after implementing the corresponding processes on the data to be transmitted, the transmitting terminal transmits the processed data.

Figure 4:
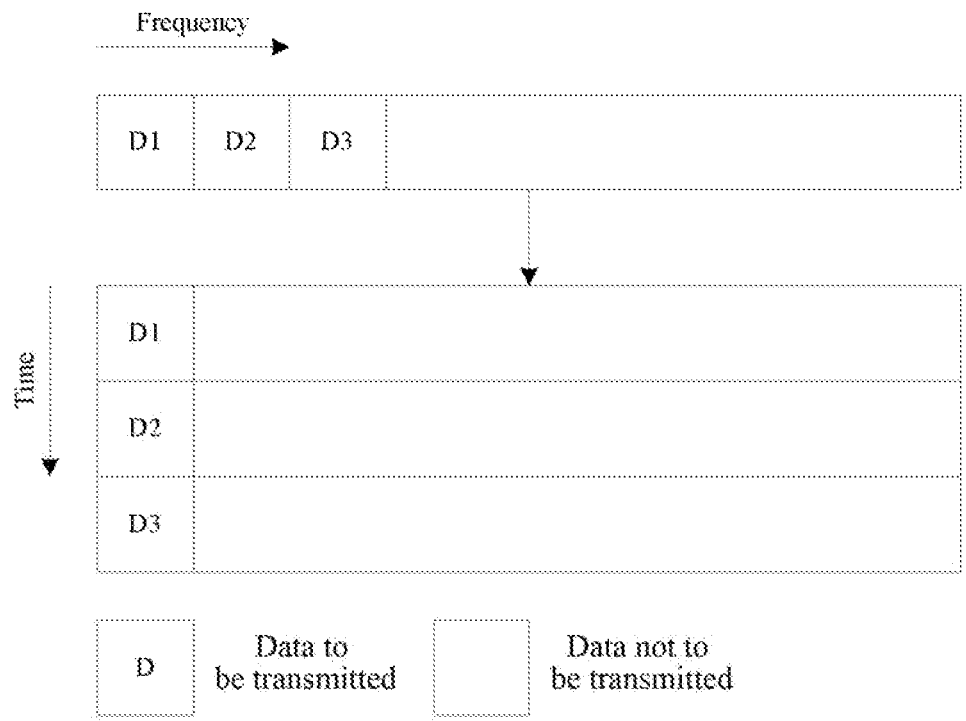
FIG. 4 is the first embodiment of time domain extension of upstream data according to the present invention.
Figure 5:
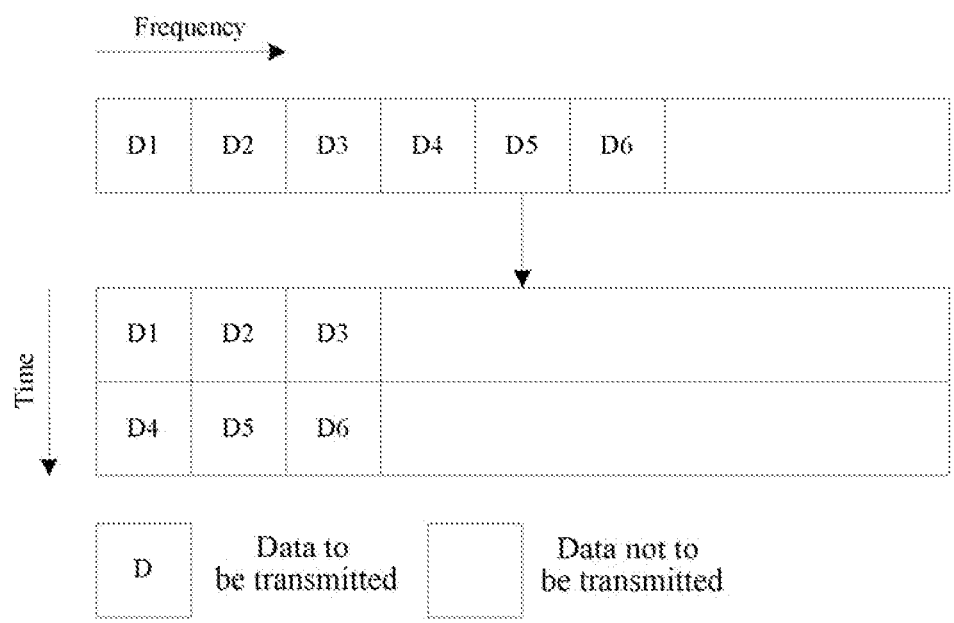
FIG. 5 is the second embodiment of time domain extension of upstream data according to the present invention.

When transmitting data, the transmitting terminal can increase time domain coverage by time domain extension, that is, the data to be transmitted on the frequency is scheduled on a plurality of TTIs on the basis of satisfying scheduling time delay. As shown in FIG. 4, there are originally three Resource Blocks (RB) of data on the frequency to be transmitted, which can now be extended in time, that is, these three RBs of data can be scheduled on three TTIs respectively, thus increasing the upstream coverage. When the coverage is increased by the time domain extension, the scheduling can be implemented flexibly, i.e., there may be only one RB on one TTI, or there may be a plurality of RBs on one TTI. As shown in FIG. 5, six RBs of D1, D2, D3, D4, D5 and D6 are divided into two groups to be transmitted on different TTIs.

The operation of time domain extension can be implemented before the constellation modulation, can be implemented after the constellation modulation and before the switching, and can further be implemented after the DFT or serial parallel conversion and before the sub-carrier mapping. The opportunity of the time domain extension will not be limited by the present invention.

The transmitting terminal further sends the notification message to the receiving terminal through the physical control channel, to indicate the multiple access mode selected by the transmitting terminal; the notification message can be transmitted after the transmitting terminal selects the multiple access mode and before the transmitting terminal sends the data, and can also be transmitted while transmitting the data, which will not be limited by the present invention.

In order to be compatible with old systems, the upstream of the transmitting terminals of the old systems can preferably be in the form of SC-FDMA, and the downstream can preferably be in the form of OFDMA.

The present invention will be further illustrated by application examples hereinafter.

The first application example:

in a system, users at the edge of the cell often cannot be fully covered, and therefore, the specific multiple access mode can be selected based on the geographic position, thus achieving to provide better coverage and link performance.

Figure 6:
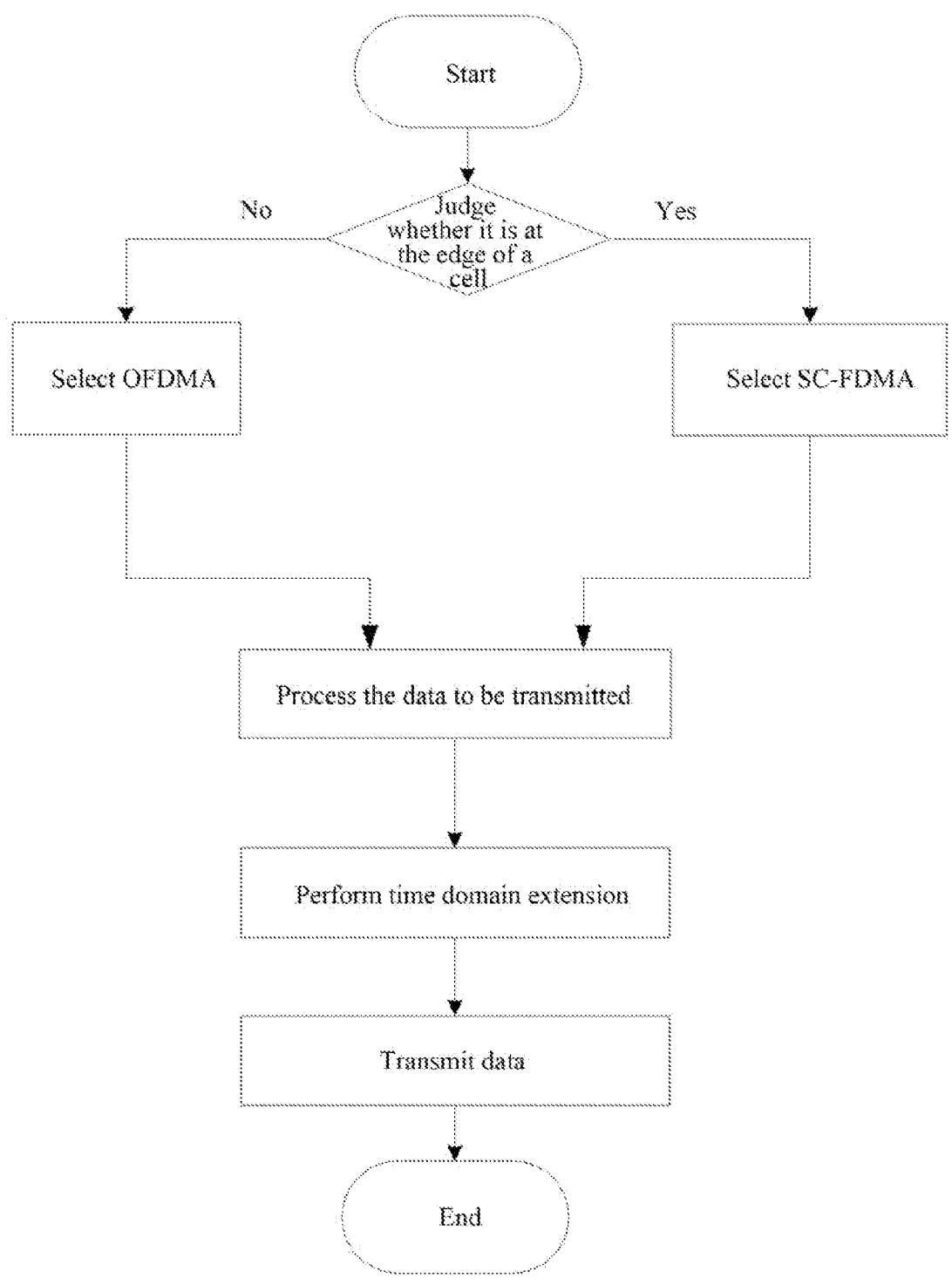
FIG. 6 is a flow chart of selecting a multiple access mode based on a geographic position and transmitting data in upstream according to the present invention.

As shown in FIG. 6, in the upstream, the transmitting terminal uses different multiple access modes based on specific conditions, i.e., determines the geographic position where the transmitting terminal is located; if a certain transmitting terminal is at the edge of the cell, the transmitting terminal can use SC-FDMA, and when the transmitting terminal moves to the center of the cell, the transmitting terminal can use OFDMA; each transmitting terminal located in a large cell can use SC-FDMA (because the range of the cell is large, the requirements on the time domain coverage is high), and each transmitting terminal located in a small cell can use OFDMA (as the range of the cell is small, the use of OFMDA can satisfy the requirements on the time domain extension coverage, and at this time, the use of OFDMA can enhance the link performance).

After determining the multiple access mode, the transmitting terminal performs corresponding processes on the data to be transmitted, if SC-FDMA is selected as the multiple access mode, the processing the data to be transmitted includes: constellation modulation, DFT, sub-carrier mapping, spatial diversity or spatial multiplexing, IFFT and CP adding, and if OFDMA is selected as the multiple access mode, the processing the data to be transmitted includes: constellation modulation, serial parallel conversion, sub-carrier mapping, spatial diversity or spatial multiplexing, IFFT and CP adding;

the transmitting terminal can also increase coverage by time domain extension. It is assumed that there are three RBs of data to be transmitted on the frequency, and on the basis of satisfying scheduling time delay, the three RBs of data can be scheduled on three TTIs respectively and then be transmitted, as shown in FIG. 4. Time domain extension is particularly important for the OFMDA. Of course, SC-FDMA can also further increase the coverage of upstream by means of time domain extension.

After receiving the data, the receiving terminal processes the received data according to the inverse process of the multiple access mode.

In order to be compatible with old systems, when the receiving terminal is located in any geographic position in downstream, the transmitting terminal preferably is in the form of OFMDA, and the receiving terminal performs corresponding operations according to the inverse process of OFDMA.

The second application:

in the system, different physical channels have different requirements. For example, the physical control channel requires coverage, reliability, etc., and the physical service channel requires high service data rate, spectral efficiency, etc. Therefore, the specific multiple access mode can be selected based on the type of the physical channel, so as to achieve to provide better coverage and link performance.

Figure 7:
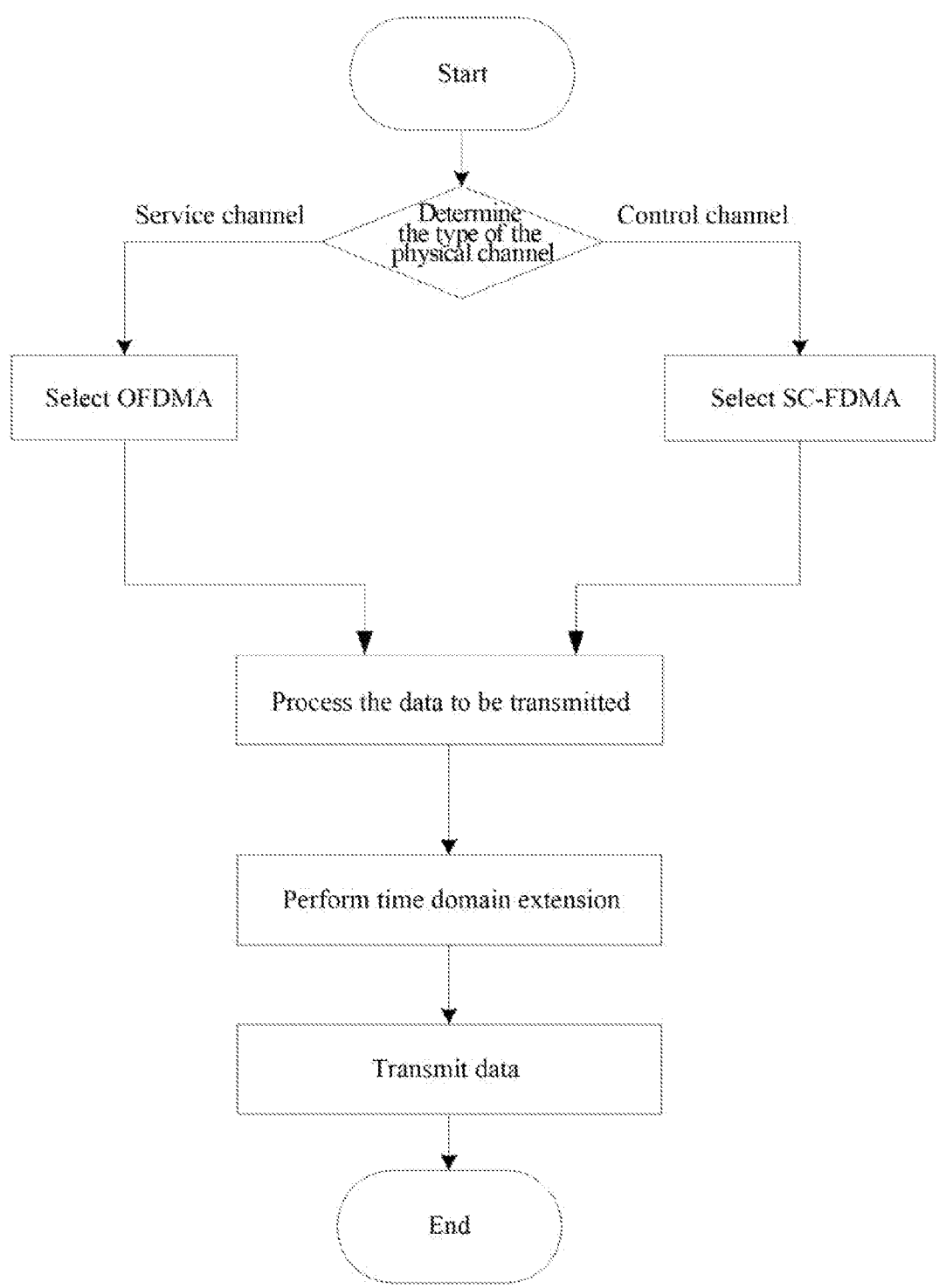
FIG. 7 is a flow chart of selecting a multiple access mode based on a type of a physical channel and transmitting data in upstream according to the present invention.

As shown in FIG. 7, when being in upstream, the transmitting terminal is based on the specific type of the physical channel. If the physical channel is a physical control channel, the transmitting terminal can use SC-FDMA, and if the physical channel is a physical service channel, the transmitting terminal can use OFDMA.

After determining the multiple access mode, the transmitting terminal performs corresponding processes on the data to be transmitted, if SC-FDMA is selected as the multiple access mode, the processing the data to be transmitted includes: constellation modulation, DFT, sub-carrier mapping, spatial diversity or spatial multiplexing, IFFT and CP adding, and if OFDMA is selected as the multiple access mode, the processing the data to be transmitted includes: constellation modulation, serial parallel conversion, sub-carrier mapping, spatial diversity or spatial multiplexing, IFFT and CP adding;

the transmitting terminal can also increase coverage by time domain extension. It is assumed that there are six RBs of data to be transmitted on the frequency, and on the basis of satisfying scheduling time delay, each three RBs of data can be scheduled on two TTIs respectively so as to increase the upstream coverage, as shown in FIG. 5. Time domain extension is particularly important for the OFMDA. Of course, SC-FDMA can also further increase the coverage of upstream by means of time domain extension.

After receiving the data, the receiving terminal processes the received data according to the inverse process of the multiple access mode.

In order to be compatible with old systems, when the receiving terminal is located in any geographic position in downstream, the transmitting terminal preferably is in the form of OFMDA, and the receiving terminal performs corresponding operations according to the inverse process of OFDMA.

INDUSTRIAL APPLICABILITY

The present invention provides a transmitting terminal and a method for transmitting data, which extends the multiple access mode when the upstream data is transmitted, and solves the problem that a single multiple access mode cannot be well suitable in the related art, that is, solves the problem that in the existing system only the PAPR is considered which reduces the link performance. The invention not only ensures the link performance of OFDMA, but also is beneficial to enhance the throughput of the entire network, and simultaneously solves the compatibility problem with the existing system by taking the coverage range into consideration.

What is claimed is:

1. A method for transmitting data, comprising: when a transmitting terminal transmits upstream data,
said transmitting terminal verifying its preference requirement;
when the transmitting terminal has a requirement on link performance higher than a requirement on time domain coverage, it selecting a multiple access mode of Orthogonal Frequency Division Multiple Access (OFDMA);
when the transmitting terminal has the requirement on time domain coverage higher than the requirement on link performance, it selecting a multiple access mode of Single Carrier-Frequency Division Multiplexing Access (SC-FDMA); and after selecting the multiple access mode, the transmitting terminal processing the data to be transmitted and transmitting the processed data;
wherein,
on the basis of satisfying scheduling time delay, the transmitting terminal processing the data to be transmitted further comprises: scheduling the data to be transmitted on two or more time transmission intervals; and
the operation of scheduling the data to be transmitted on two or more time transmission intervals is implemented before constellation modulation, is implemented after the constellation modulation and before switching, or is implemented before sub-carrier mapping.

2. The method according to claim 1, wherein,
if the transmitting terminal selects the multiple access mode of SC-FDMA, the processing the data to be transmitted comprises: constellation modulation, Discrete Fourier Transform (DFT), sub-carrier mapping, spatial diversity or spatial multiplexing, Inverse Fast Fourier Transform (IFFT) and CP adding; and
if the transmitting terminal selects the multiple access mode of OFDMA, the processing the data to be transmitted comprises: constellation modulation, serial parallel conversion, sub-carrier mapping, spatial diversity or spatial multiplexing, IFFT and CP adding.

3. The method according to claim 1, wherein, the transmitting terminal selecting the multiple access mode further comprises:
selecting the multiple access mode of SC-FDMA when the transmitting terminal is at the edge of a cell;
selecting the multiple access mode of OFDMA when the transmitting terminal is in the center of the cell.

4. The method according to claim 1, wherein, the transmitting terminal selecting the multiple access mode further comprises:
selecting the multiple access mode of SC-FDMA when the transmitting terminal transmits the data using a physical control channel;
selecting the multiple access mode of OFDMA when the transmitting terminal transmits the data using a physical service channel.

5. The method according to claim 1, wherein,
the method is suitable for a long term evolution system, an advanced long term evolution system, or an international mobile telecommunications-advanced system.

6. A transmitting terminal, comprising: a selection module, a data processing module and a transmitting module; wherein,
the selection module is configured to: verify its preference requirement when the transmitting terminal transmits upstream data;
when the transmitting terminal has a requirement on link performance higher than a requirement on time domain coverage, select a multiple access mode of Orthogonal Frequency Division Multiple Access (OFDMA); and
when the transmitting terminal has the requirement on time domain coverage higher than the requirement on link performance, select a multiple access mode of Single Carrier-Frequency Division Multiplexing Access (SC-FDMA);
the data processing module is configured to process the data to be transmitted; and
the transmitting module is configured to transmit the processed data;
wherein,
the data processing module further comprises a time domain extension unit, which is configured to schedule the data to be transmitted on two or more time transmission intervals on the basis of satisfying scheduling time delay; and the time domain extension unit is located before a constellation modulation unit, is located between a constellation modulation unit and a switching unit, or is located before a sub-carrier mapping unit.

7. The transmitting terminal according to claim 6, wherein, the data processing module comprises a constellation modulation unit, a switching unit, a Discrete Fourier Transform (DFT) unit, a serial parallel conversion unit, a sub-carrier mapping unit, a spatial diversity or spatial multiplexing unit, an Inverse Fast Fourier Transform (IFFT) unit and a CP adding unit;

the selection module is further configured to send the selected multiple access mode to the data processing module; and the switching unit is configured to: receive the multiple access mode, send the received, constellation modulated data to the DFT unit when the multiple access mode is SC-FDMA, and send the received, constellation modulated data to the serial parallel conversion unit when the multiple access mode is OFDMA.

8. The transmitting terminal according to claim 6, wherein, the selection module is further configured to: select the multiple access mode of SC-FDMA when the transmitting terminal is at the edge of a cell, and select the multiple access mode of OFDMA when the transmitting terminal is in the center of the cell.

9. The transmitting terminal according to claim 6, wherein, the selection module is further configured to: select the multiple access mode of SC-FDMA when the transmitting terminal transmits the data using a physical control channel, and select the multiple access mode of OFDMA when the transmitting terminal transmits the data using a physical service channel.

10. The transmitting terminal according to claim 6, wherein, the transmitting terminal is suitable for a long term evolution system, an advanced long term evolution system, or an international mobile telecommunications-advanced system.

* * * * *